United States Patent

Plante

[15] 3,657,528
[45] Apr. 18, 1972

[54] RMS VOLTMETER AND LOG CONVERTER

[72] Inventor: Lawrence M. Plante, 6092 Cilmere Drive, Brookpark, Ohio 44142

[22] Filed: July 10, 1970

[21] Appl. No.: 53,789

[52] U.S. Cl. .......................... 235/193, 235/193.5, 328/145, 307/229
[51] Int. Cl. ...................................... G06g 7/20, G06g 7/24
[58] Field of Search ............. 235/193, 197, 184, 183, 193.5; 328/145; 324/132; 307/229, 230

[56] References Cited

UNITED STATES PATENTS

| | | | |
|---|---|---|---|
| 3,342,984 | 9/1967 | Gray et al. | 235/193 X |
| 3,439,187 | 4/1969 | Strauss | 328/145 X |
| 3,500,198 | 3/1970 | Kaiser et al. | 324/132 |
| 3,502,959 | 3/1970 | Stellman | 328/145 X |
| 3,532,868 | 10/1970 | Embzey | 328/145 X |

*Primary Examiner*—Joseph F. Ruggiero
*Attorney*—Fay, Sharpe and Mulholland

[57] ABSTRACT

An RMS voltmeter and logarithmic converter using electronic mathematical operators for determining the RMS value and its logarithm of an input signal. A source of electrical signals to be measured is connected to the input of an absolute-value circuit. The output from the absolute-value circuit provides the input to a log converter circuit having an output which provides one of the inputs to a summing circuit. The output from the summing network provides the input to an antilog converter circuit. The output from the antilog converter circuit provides the input to an averaging circuit having its output connected to the input of a second log converter circuit. The output from the second log converter circuit is in circuit with the second input to the summing circuit. One of the two inputs to the summing circuit is scaled by a factor of two to achieve the squaring function required by the converter. In an alternative embodiment, means are disclosed for causing the instrument to operate in either the averaging or in the RMS mode to provide either a linear or logarithmic output. In addition, means are disclosed for selecting the time constant of the averaging circuit to accommodate a wide frequency range for the input signals.

24 Claims, 8 Drawing Figures

INVENTOR
LAWRENCE M. PLANTE

BY Fay, Sharpe & Mulholland
ATTORNEYS

FIG. 8.

RMS VOLTMETER AND LOG CONVERTER

BACKGROUND OF THE INVENTION

This invention relates to a root means square (RMS) voltmeter and log converter. More particularly, this invention relates to a circuit for deriving the RMS value and the logarithm thereof for direct or capacitively coupled random or cyclic electrical signals.

In the electrical arts, the three quantities most commonly used to characterize the magnitude of an alternating signal are its peak value, its average absolute value, and its RMS value. The peak value of a signal represents the maximum value of the signal during the time that the signal is under review. The average value of the signal represents the means average of the absolute value of the signal over a discrete period of time. While peak and average values of a-c signals are sometimes of interest, knowledge of the RMS value of the signal is generally of greater importance to the observer because of its direct relationship to the power dissipated by a circuit.

Thus, circuits are known which accurately relate an a-c input signal to a d-c signal having an equivalent heating effect. For example, where symmetrical input signals are to be measured, it is sometimes satisfactory to measure the average value with an instrument calibrated to read out the RMS value by the use of an appropriate conversion factor. Such circuits are deficient for precision work, however, because of their high sensitivity to harmonic distortion in the input signal. It is thus the aim of the invention to provide a circuit for measuring the RMS value of a signal while preserving the asymmetry of the input signal about is base line. Moreover, such a circuit must have a sufficient dynamic range and crest factor capability to accommodate input signals which exhibit extreme departures from symmetry. For example, the integrator circuit used to obtain the mean value of the input signal should preferably have a range of selectable time constants which are compatible with the various signal frequencies and wave shapes that fall within the measurement range of the circuit.

By its definition, the determination of the RMS value of a signal is explicit with respect to the sequence of the mathematical operations which are performed on the input signal. Thus, the square of the absolute value of the signal must first be determined, and the mean of the square must then be provided, so that the root of the mean of the square may be determined to provide the desired information about the characteristics of the input signal.

As indicated, instruments are known which provide the RMS value of a signal. Such instruments include iron-vane, electrostatic, and electrodynamometer types of instruments, which are largely unsatisfactory for precision work or for use over a wide dynamic range because of their low input impedance and the fact that they are confined to low frequency operation. A thermocouple circuit having an output applied to a d'Arsonval instrument provides an RMS indication which overcomes some of the problems due to harmonics and frequency range. However, such circuits have a low input impedance, relatively slow response times and limited overload capabilities.

RMS electronic voltmeters overcome many of the problems associated with simple thermocouple systems by utilizing a high-gain a-c amplifier to achieve a high input impedance. However, these circuits generally use coupling capacitors for the a-c amplifiers which block and d-c components which are present. It is thus the art positive developing RMS voltmeters to provide an instrument which responds to both a-c or d-c signals or to a combination thereof.

An article in the April, 1965 issue of "Electro-Technology", at page 38, briefly discusses these restraints on RMS voltmeters, while an article at page 129 of the Sept. 1966 issue of "Electronic Products" describes an RMS/d-c converter.

In addition to overcoming the foregoing problems in the development of RMS voltmeters, it is desirable to provide the instrument with a wide dynamic range. Logarithmic converters have been a useful tool to enhance the dynamic range of a circuit by compressing the input signal with a log generator and expanding the output signal with an antilog generator. A number of circuits are known which provide logarithmic conversion by the use of transistors in conjunction with operational amplifier circuits. By way of background, examples of such circuits are described in *IEEE Transactions on Circuit Theory*, Vol. CT-11, No. 3, p. 378 (September 1964), *Review of Scientific Instruments*, Vol. 34, No. 12 at p. 1311 (December 1963) and *IEEE Spectrum*, p. 69 (November, 1969). Those disclosures are hereby incorporated by reference herein.

It is thus an object of this invention to provide an RMS voltmeter and log converter which overcomes the aforementioned problems in the art.

It is another object of this invention to provide an RMS voltmeter and log converter which possesses a wide dynamic range, for example, a range of about 80 dB.

It is another object of this invention to provide an RMS voltmeter which is capable of measuring complex signals having high crest factors while preserving the asymmetry of the signal about its base line.

It is still another object of this invention to provide an RMS voltmeter and log converter which permits selection of the integrating time constants.

It is another object of this invention to provide an instrument which produces an output which is logarithmically proportional to the RMS value of an input signal so that the output may be monitored by using a limited dynamic range display device.

It is another object of this invention to accommodate both a-c and d-c input signals while retaining the ability to suppress the d-c components of the measured signal.

It is another object of this invention to provide a circuit capable of generating a d-c voltage which is proportional to the absolute average value of a measured signal.

These and other objects of this invention will become apparent from a review of the following specification taken in conjunction with the accompanying drawings.

BRIEF SUMMARY OF THE INVENTION

Directed to overcoming the problems of the prior art and to achieving the aforestated objects, the circuit according to the invention comprises means for determining the RMS value of an input signal and for providing a logarithmic output signal which indicates the RMS value. In a preferred embodiment, a source of input signals provides the input to circuit means for determining the absolute value of the input signal. The input signal is provided to an input terminal of a first operational amplifier having a pair of diodes connected to its output to produce a pair of output signals which respectively represent components of the input signal having positive and negative polarities. The pair of output signals from the diodes provide the inputs to a second operational amplifier in the absolute value circuit. The second operational amplifier inverts the input signals of one polarity so that output signals have the same polarity.

The output signals from the second operational amplifier provide the input to a first logarithmic converter circuit which provides an output signal which is logarithmically proportional to the input signal. The logarithmic converter comprises an operational amplifier having an NPN transistor connected in its feedback path. The collector and the base of the transistor are connected to an input terminal of the operational amplifier while the emitter of the transistor is connected to the output of the operational amplifier.

The output from the logarithmic converter is directly connected to one of the inputs to a summing circuit including an operational amplifier. The output from the summing circuit is connected to the input of an antilog converter circuit. The antilog converter circuit comprises an NPN transistor having its emitter connected to the output of the summing circuit and both its collector and its base connected to an input of an operational amplifier.

The output from the antilog converter circuit provides the input to an averaging circuit comprising a low pass R-C filter connected to an input terminal of an operational amplifier. The output from the averaging circuit is connected to the input of a second log converter circuit of the type previously described generally. The output from the second log converter provides the second input to the summing circuit scaled at a factor of one-half relative to the first input to the summing circuit to achieve the squaring function for the RMS circuit by the use of logarithmic circuits. As will be seen from the mathematical development accompanying the detailed description of the drawings, the circuit provides the RMS value of the input signal through the use of appropriately connected electronic mathematical operators.

In a second embodiment, means are provided for selecting the averaging time constant for the circuit to accommodate a wide range of input signals. In addition, means are provided for operating the instrument in an average mode or in an RMS mode to provide either a linear output or a logarithmic output.

DETAILED DESCRIPTION OF THE INVENTION

Figure 1:
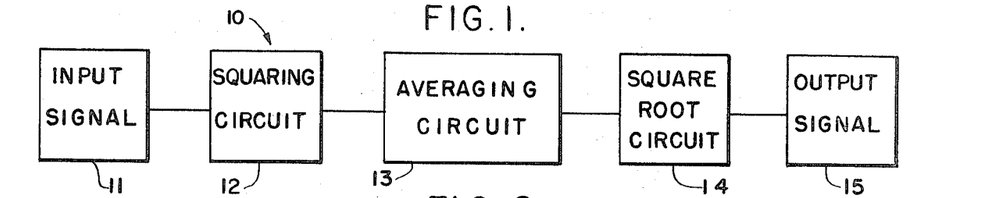
FIG. 1 is a block diagram of the components for determining the RMS value of an input signal.

A block diagram of the components used in an RMS circuit designated generally at 10 are shown in FIG. 1. A source 11 of input signals to be measured provides the input to a squaring circuit 12, which provides an output signal which is the square of the amplitude of the input signal. The output from the squaring circuit 12 constitutes the input to the mean averaging circuit 13 which produces an output signal which is the mean of the squared representation of the input signal from the circuit 12. The output from the mean averaging circuit 13 provides the input to a square root circuit 14 which provides an output signal 15 which is a representation of the square root of the mean square of the input signal. Thus, the circuit 10 provides an output signal $V_o$ for an input signal $v = V(t)$ which satisfies the general equation:

$$V_o = \sqrt{\frac{1}{T}\int_{t_1}^{t_2} V^2(t)\,dt}$$

Figure 2:
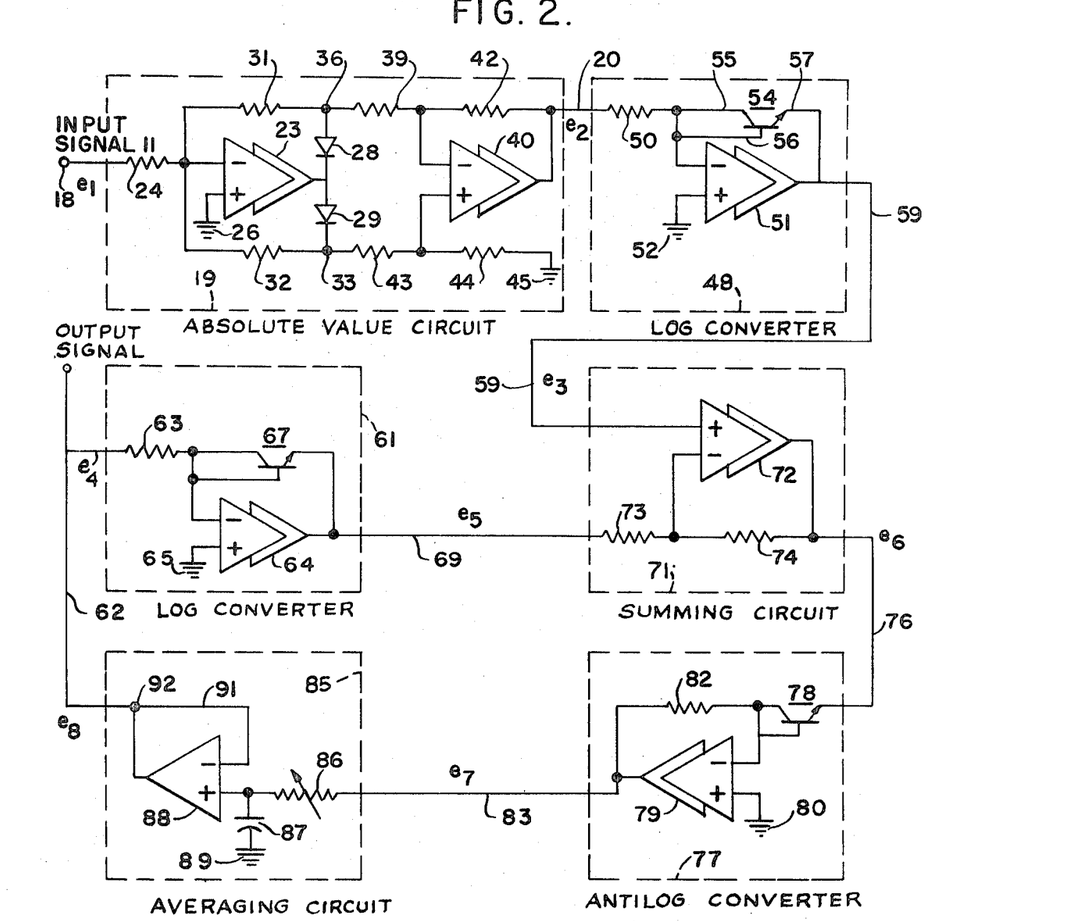
FIG. 2 is a detailed diagram illustrating the circuit according to the invention.

As shown in FIG. 2, the input signal 11 is applied to a circuit input terminal 18. Circuit means, designated generally within the phantom rectangle 19, are provided to generate a signal representing the absolute value of the input signal at the output of the circuit 19. Thus, for an input signal denoted by the expression: $e_1 = e_{in}$ (1) applied to input terminal 18, the output signal at least 20 is given by the expression: $e_2 = |e_1|$ (2). From equation (2), it is apparent that: $e^2_2 = e^2_1$ (3)

This form of the expression will be useful in the later mathematical development.

Figure 3:
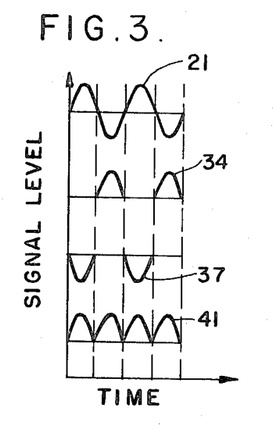
FIG. 3 is a plot of various waveforms relative to time taken at various points in the averaging circuit in FIG. 2.

The operation of the absolute value circuit 19 is best understood by reference to FIG. 3 which illustrates a set of waveforms relative to time at different points in the circuit 19 as a function of a varying bipolar input signal 11. Thus, for purposes of illustration, the input signal 11 as applied to terminal 18 will be assumed to have the waveform designated by the curve 21 in FIG. 3. The input signal 11, having the waveform 21, is applied to the negative input terminal of a combination preamplifier —operational amplifier 23 through an input resistor 24. The symbolic representation designated by reference numeral 23 in FIG. 2 refers to the preferred embodiment which uses a preamplifier-amplifier combination (hereinafter simply referred to as an "amplifier") which utilizes a commercially available remotely controlled heated substrate integrated circuit as the input stage. The amplifier 23 has its positive input terminal connected to a source of reference potential 26, for example, ground. Throughout this specification, the terms "source of reference potential" and "ground" are used interchangeably.

The output from the amplifier 23 is connected to the common junction between a pair of oppositely-poled diodes 28 and 29 which conduct on alternate portions of the cycle. The diodes 28 and 29 are rendered theoretically perfect by the use of negative feedback through resistors 31 and 32 respectively connected between the output and input of amplifier 23.

The waveform at node 33 is designated by numeral 34 in FIG. 3 while the waveform which appears at terminal 36 is designated by numeral 37. Thus, waveform 34 is positive with respect to the datum signal level while waveform 37 is negative with respect thereto. The signal 37 is provided through a resistor 39 to the negative input terminal of amplifier 40 which inverts the waveform to constitute one half of the output waveforms, designated by numeral 41 and labeled $e_2$ in FIG. 2 at the output lead 20. A feedback resistor 42, having the same resistance value as resistor 39, is connected between the output and the negative input of the amplifier 40 to provide inversion of the signal 37 at a gain of one.

On alternate half cycles, the signal 34 is provided to the positive input terminal of amplifier 40 through a resistor 43. A resistor 44, having the same resistance value as resistor 43, is also connected to the positive terminal of amplifier 40 and to ground 45.

Since the resistance of resistors 43 and 44 is the same, the signal 34 is attenuated by a factor of two and then amplified by a factor of two because of the values of resistors 39 and 42 resulting in a transfer of the signal 34 to the lead 20 at a gain of one.

The output $e_2$ of the absolute value circuit 19 on lead 20 provides the input to a log converter circuit enveloped in the phantom rectangle designated by reference numberal 48. The purpose of the log converter circuit 48 is to scale logarithmically the input to the log converter in a predictable mathmetical relationship to obtain consistent resolution of any point over a range of observation which is usually greater than a factor of 10.

Electronically, logarithmic scaling is accomplished by using an amplifier having a gain which is inversely proportional to the magnitude of its input signal while compressing the higher levels and expanding the lower levels in a predictable mathematical fashion. An NPN transistor, when used as the feedback element of an operational amplifier develops a voltage across its base-emitter terminals which is logarithmically proportional to its collector current. These techniques and their theoretical bases are developed in detail in articles by W. L. Patterson, 34 *Rev. Sci. Instr.* 1311 (Dec. 1963) and J. F. Gibbons and H. S. Horn, *IEEE Transactions on Circuit Theory*, Vol. CT-11, 378 (Sept. 1964), the disclosures of which are incorporated by reference for completeness of disclosure.

The signal $e_2$ on lead 20 is thus provided through an input resistor 50 to the negative input terminal of amplifier 51 which has its positive input terminal connected to ground 52. An NPN transistor 54 has its collector 55 and its base 56 connected to the input resistor 50 and to the negative input terminal of the amplifier 51 and its emitter 57 connected to the output of the amplifier 51. The linear relationship of the output of circuit 48 over a wide range of logarithmically related inputs is shown by the curve designated by the reference numeral 58 in FIG. 4. Thus, the output on lead 59 of the log converter circuit 48 is given by the expression:

$$e_{out} = K \log I_{in} \quad (4)$$

Figure 4:
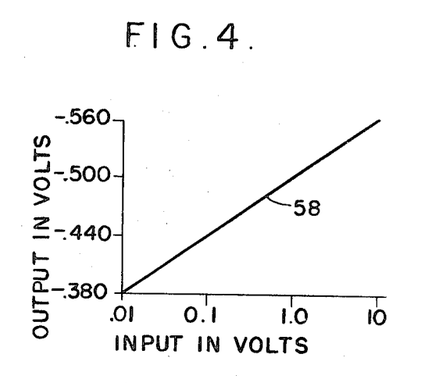
FIG. 4 is a plot of the output signal relative to the input signal for the logarithmic converters in FIG. 2.

But, $$I_{in} = e_{in}/R_{in}$$

where $e_{in}$ is the signal on lead 20 and $R_{in}$ is resistor 50. Thus, $$e_{out} = K \log e_{in}/R_{in} \quad (5)$$

where K is about 60 millivolts per decade change of input signal, as seen in FIG. 4.

If the voltage on lead 59 is designated $e_3$ and from eq. 2 above, the voltage on lead 20 is designated $e_2$, equation 5 may be rewritten in its generalized form by the expression:

$$e_3 = 31\ KT/Q \log_e e_2/I_0R \quad (6)$$

where: $I_o$ is a function of the emitter saturation current for the transistor 54 ($I_o = \alpha_f I_{es}$);

R is resistor 50;

K is Boltzmann's constant ($1.381 \times 10^{-23}$ joules / °K );

Q is the charge on an electron ($1.602 \times 10^{-19}$ coulomb); and

T is absolute temperature in degrees Kelvin (°K)

A second log converter circuit is shown in the phantom rectangle designated by the reference numeral 61. The log converter circuit 61 includes an input lead 62 connected to an input resistor 63 which is connected to the negative terminal of an amplifier 64 having its positive terminal connected to ground 65. An NPN transistor 67 is connected and operates in the same manner as transistor 54 in the log converter 48. The input signal to the log converter circuit 61 on lead 62 may be designated as $e_4$. As will be seen, the signal on lead 62 will provide the RMS output for the input signal 11, so that, if that condition is true, then:

$$e_4 = e_{out} \quad (7)$$

The output of the circuit 61 on lead 69 (designated $e_5$), similar to the development in the case of circuit 48 is thus given by the expression:

$$e_5 = -KT/Q \log_e e_4/I_0R \quad (8)$$

The signals on leads 59 and 69 respectively provide the inputs to the summing circuit in the phantom rectangle designated by reference numeral 71. The lead 59 is connected to the positive terminal of an operational amplifier 72 while the lead 69 is connected to the negative terminal of amplifier 72 through a scaling resistor 73. Negative feedback is provided from the output of amplifier 72 to its negative input through resistor 74 which has the same value as resistor 73.

Figure 5:
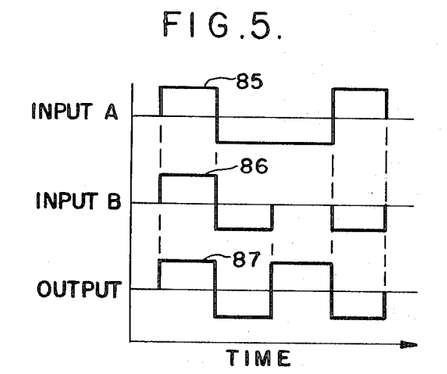
FIG. 5 is a plot of the output for certain relative conditions of the inputs to the summing circuit in FIG. 2.

The operation of the summing circuit 71 may be understood by reference to FIG. 5 which illustrates the output of the summing circuit as a function of varying bipolar input signals. The curve designated by reference numeral 85 represents a typical signal applied to the negative terminal of the amplifier 72 while the curve designated by reference numeral 86 represents a typical signal applied to the positive terminal of the amplifier 72. When signals 85 and 86 are thus applied to amplifier 72, an output signal having a waveform shown by the curve 87 is produced.

Thus, the output of the summing circuit 71, designated $e_6$ on lead 76, is given by the expression:

$$e_6 = 2\ e_3 - e_5 \quad (9)$$

From equations (6) and (8):

$$e_6 = 2\ \frac{KT}{Q} \log_e \left[\frac{e_2}{I_0R}\right] - \frac{KT}{Q} \log_e \left[\frac{e_4}{I_0R}\right]$$

$$= \frac{KT}{Q} \log_e \left[\frac{e_2}{I_0R}\right]^2 - \frac{KT}{Q} \log_e \left[\frac{e_4}{I_0R}\right]$$

$$= \frac{KT}{Q} \log_e \left[\left(\frac{e_2}{I_0R}\right)^2 \left(\frac{I_0R}{e_4}\right)\right]$$

$$= \frac{KT}{Q} \log_e \left[\frac{e_2^2}{(I_0R)e_4}\right]$$

Since $e_2^2 = e_1^2$ from eq. (2):

$$-e_6 = KT/Q \log_e [e_1^2/(I_0R)\ e_4] \quad (10)$$

Figure 6:
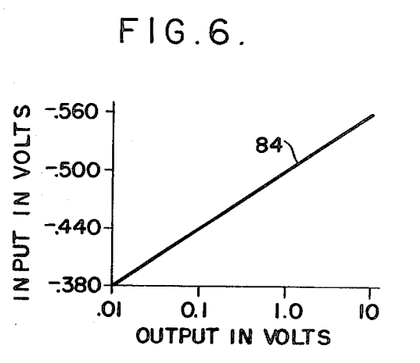
FIG. 6 is a plot of the output for a range of inputs to the antilog converter circuit of FIG. 2.

The output lead 76 from the summing circuit 71 provides the input to an antilog converter circuit 77. The operation of the antilog converter circuit 77 is opposite to the log converter circuits 48 and 61. Thus lead 76 is connected to the emitter of an NPN transistor having its base and collector connected to the negative input terminal of an amplifier 79 having its positive terminal connected to ground 80. A feedback resistor 82 is connected from the output of amplifier 79 to the negative input terminal thereof. The transfer characteristics of the antilog circuit 77 are shown by the curve designated by reference numeral 84 in FIG. 6. The output from the antilog converter circuit 77 is provided on lead 83 and is designated:

$$e_7 = (I_0R)e^{(Q/KT)(-e_6)} \quad (11)$$

where $e_6$ is the signal on lead 76 designated by equation 10. Thus, $$e_7 = (I_0R)e^{(Q/KT)(KT/Q)(\log_e[e_1^2/(I_0R)e_4])}$$

$$= (I_0R)e^{\log_e[e_1^2/(I_0R)e_4]}$$

$$= (I_0R)\left[\frac{e_1^2}{(I_0R)e_4}\right]$$

$$\therefore e_7 = \frac{e_1^2}{e_4} \quad (12)$$

Figure 7:
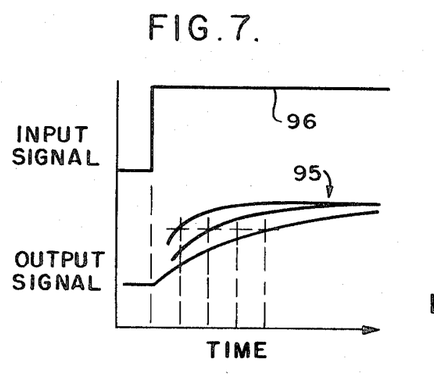
FIG. 7 is a plot of a family of output signals obtained in response to an input signal for varying resistance values of the averaging circuit in FIG. 2.

The output from the antilog converter circuit on lead 83 provides the input to an averaging circuit shown in the phantom rectangle designated by the reference numeral 85. Lead 83 is connected to a variable resistor 86 which is connected to one terminal of a capacitor 87 and to the positive input terminal of an operational amplifier 88. The other terminal of the capacitor 87 is connected to ground 89. The output of the operational amplifier 88 is directly connected to the negative input terminal thereof by lead 91. The resistor 86 and the capacitor 87 operate as a low pass filter or unit lag circuit for the input signal. The output from the low pass filter is buffered by the action of the operational amplifier 88 which also acts as an isolation amplifier. A family of curves designated generally at 95 in FIG. 7 represent the output of the averaging circuit 85 for an input signal 96 applied thereto. The various curves in the family are obtained by varying the value of resistor 86.

The output from the averaging circuit 85 at node 92 is given by:

$$e_8 = e_7\ 1/1+T_1P \quad (13)$$

where $T_1$ is the time constant of the averaging circuit (R 86, C 87) and $P$ is the Heaviside operator ($d/dt$, or $jw$ for sine waves)

From eqns. (12) and (13):

$$e_8 = e_1^2/e_4\ 1/1+T_1P \quad (14)$$

Since node 92 is connected to lead 62, $$e_8 = e_4$$

$$\therefore e_4 = \left(\frac{e_1^2}{e_4}\right)\left(\frac{1}{1+T_1P}\right) \quad (15)$$

$$e_4^2 = \frac{e_1^2}{1+T_1P}$$

$$e_4 = \sqrt{\frac{e_1^2}{1+T_1P}}$$

Since $e_4 = e_{out}$ and $e_1 = e_{in}$ $$e_{out} = \sqrt{\frac{e_{in}^2}{1+T_1P}}$$

Figure 8:
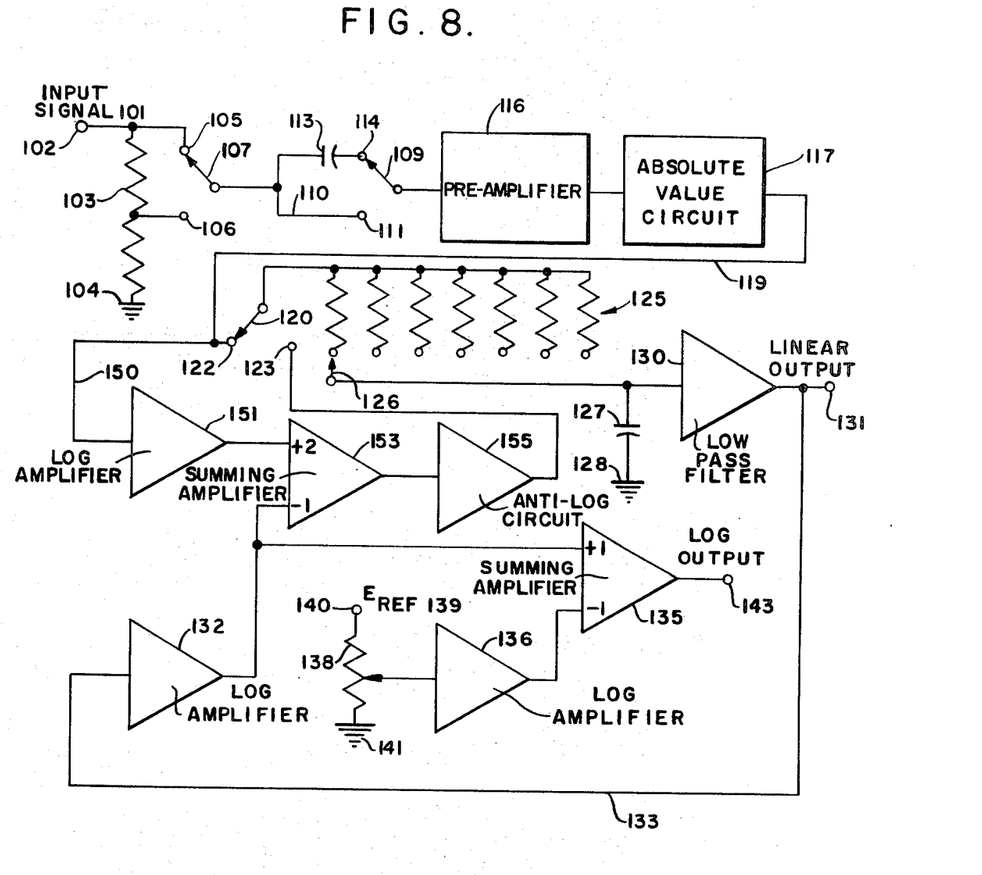
FIG. 8 shows an alternate embodiment of the invention illustrating means for selecting the averaging time constants and means for operating the circuit of the invention in either an absolute average mode or in an RMS mode.

FIG. 8 illustrates the invention of FIG. 2 having several additional capabilities. The input signals 101 to be measured are applied to the input terminal 102. An input resistor 103 is connected between terminal 102 and ground 104 and includes a pair of taps 105 and 106 to scale the input signal to a value within the capabilities of the circuit. When the switch 107 is connected to the tap 105, for example, the range may be 10 volts, while when set at tap 106 the range may be 100 volts.

An a-c or d-c selector switch 109 may be connected either directly to the switch 107 through lead 110 and tap 111 or through capacitor 113 and tap 114 to accommodate d-c or a-c signals respectively. The circuit may operate for a-c signals applied through lead 110 unless it is desirable to remove d-c components from the a-c signal. The switch 109 is connected to the input of a pre-amplifier circuit 116 having its output connected to an absolute value circuit 117. The absolute value circuit is described in connection with circuit 19 in FIG. 2. The output from the absolute value circuit is provided on lead 119 to a switch 120 which may be selectively connected to either a tap 122 or a tap 123 to permit the circuit to operate in either an average or an RMS mode respectively.

When switch 120 is connected to tap 122, the circuit is connected to operate in the average mode. One of a plurality of resistors, designated generally at 125, may be selectively inserted in circuit with the switch 120 by the positioning of a switch 126 in circuit with a capacitor 127 having one of its terminals connected to ground 128. Each of the resistors 125 has a value different from any one of the other resistors of the bank. The value of the resistor 125 which is selected and the value of the capacitor 127 determine the time constant T for the operation of the circuit, according to the mathematical development discussed with FIG. 2. Preferably, the range of time constants may vary from about 0.1 to about 100 sec.

The output from the capacitor 127 is connected to the input of a low pass filter 130 to provide the output at a linear output terminal 131. The signal at the linear output terminal 131 is provided to the input of a log amplifier 132 on lead 133. The output from the log amplifier 132 provides the input to the positive terminal of the summing amplifier 135.

The input to the negative terminal of the summing amplifier 135 is provided from the output of a log amplifier 136. The input to the log amplifier 136 is provided from the variable tap of a variable resistor 138 connected between a source of reference potential 139 at tap 140 and ground 141. The reference potential is the full scale voltage level for the instrument, for example 10 volts or 100 volts, as described above. Both of the inputs to the summing amplifier 135 are amplified at a gain of unity to produce an output signal at the log output terminal 143.

When the circuit of FIG. 8 is operated in the average mode thus described, the average value of the input signal 101 over the time selected by the positioning of switch 126 is provided at terminal 131. Simultaneously, a logarithmic representation of the magnitude of the average value of the signal is produced at the log output terminal 143. The operation of the log amplifiers 132 and 136 is similar to the operation of the circuits 48 and 61 described in connection with FIG. 2.

When the switch 120 is connected to the tap 123, the circuit operates in the RMS mode to produce a signal at the linear output terminal 131 which is representative of the RMS value of the input signal 101. Simultaneously, a logarithmic representation of the RMS value of the input signal is provided at terminal 143.

In the RMS mode, the output from the absolute value circuit 117 which is provided on lead 150 comprises the input to a log amplifier 151. The output from the log amplifier 151 is connected to the positive input of a summing amplifier 153. The negative input to the summing amplifier 153 is connected to the output of the log amplifier 132. The positive input signal to the log amplifier 153 is scaled at a factor of two to obtain the squaring operation by the use of electronic mathematical operators in the manner described in connection with circuit 71 in FIG. 2.

The output from the summing amplifier 153 is connected to the input of an anti-log circuit 155 having its output connected to tap 123 and, hence, to the low pass filter 130. It will be seen that the arrangement of circuit components when switch 120 is set so the circuit of FIG. 8 operates in the RMS mode is like the circuit arrangement discussed in greater detail in connection with FIG. 2 with the added capability of providing a logarithmic representation of the RMS signal corresponding to the input signal.

Thus, the circuits according to the invention may be used for a wide number of applications, including a-c to d-c conversion with logarithmic or linear scaling for $x$–$y$ recorders, A to D converters, optical oscillographs and strip chart recorders, by way of example. The circuit operates at an accuracy of 25°C of $\pm 3$ percent for a linear output and $\pm 0.25$ percent for a logarithmic output for the upper 70 dB. of its range, and at $\pm 6$ percent for a linear output and $\pm 0.5$ dB. for a logarithmic output at the lower 10 dB. of its range.

A number of the equations developed in connection with the description of the circuit of FIG. 2 include either or both of two temperature dependent terms, i.e. the scalar quantity $KT/Q$, which is linearly related to temperature, and $I_o = (\alpha_f I_{es})$, which is a non-linear function having a value dependent upon the geometry and mobility constant of the transistor selected in the log or anti-log circuits. The latter term generally doubles for about every 10° C temperature rise. The $I_o$ terms can be reduced to a constant and cancelled by using a log ratio circuit having a pair of log converters providing the inputs to a summing circuit. The former temperature dependent scalar $KT/Q$ can be compensated for by following the log ratio circuit with an amplifier having a gain which is inversely proportional to temperature.

The invention may be embodied in other specific forms without departing from the spirit or essential characteristics thereof. The described embodiments are thus intended to be illustrative and not restrictive. The scope of the invention is indicated by the appended claims.

What is claimed is:

1. An electrical circuit for computing a characteristic of an input signal comprising the combination of:
    input circuit means for providing an electrical signal from said input signal characterized in that all of the components of said electrical signal have the same polarity with respect to a reference signal level;
    first means for receiving said electrical signal and for providing a first signal which is logarithmically related to said electrical signal;
    means for summing at least a pair of signals to provide a second signal which is a function of the sum of said pair of signals, and wherein one of said pair of signals is said first signal;
    antilog converter means for receiving said second signal and for providing a third signal which represents the antilog of said second signal;
    averaging means for receiving said third signal and for providing a fourth signal which represents the average of said third signal over a selected period of time; and
    second means for receiving said fourth signal and for providing a fifth signal which is logarithmically related to said fourth signal, said fifth signal comprising the other of said pair of signals to said summing means.

2. The circuit as defined in claim 1 wherein said electrical circuit provides an output signal which is the root mean square of said input signal, and wherein said summing circuit includes means for summing said first signal at a factor of twice the fifth signal.

3. The circuit as defined in claim 2 wherein said output signal is said fourth signal.

4. The circuit as defined in claim 2 wherein said input circuit means includes: a source of input signals, and absolute value circuit means, including rectifier means, in circuit with said source of input signals for providing said electrical signal which is further characterized as representing the absolute value of said input signals.

5. The circuit as defined in claim 2 wherein said input circuit means comprises:

an input signal source, first amplifier means in circuit with said input signal source to provide a pair of output signals, each of which represents the components of said input signal having the same polarity with respect to a reference signal level, one of said pair of said pair of signals being negative relative to said reference level, the other of said pair of signals being negative relative to said reference level, and means for inverting the polarity of one of said pair of output signals from said first amplifier means to produce said electrical signal.

6. The circuit as defined in claim 5 wherein said first amplifier means includes rectifier means for rectifying the output from said first amplifier means to produce said pair of output signals.

7. The circuit as defined in claim 2 wherein said first means comprises an operational amplifier which includes a transistor in circuit with both the input and the output of said operational amplifier.

8. The circuit as defined in claim 2 wherein each of said first means and said second means comprises an operational amplifier which includes a transistor in circuit with both the input and the output of each of said operational amplifiers.

9. The circuit as defined in claim 8 wherein said antilog converter means comprises an operational amplifier including a transistor in the input circuit of said operational amplifier.

10. The circuit as defined in claim 9 wherein said averaging means comprises a low pass filter.

11. The circuit as defined in claim 2 further including means for varying said selected period of time.

12. The circuit as defined in claim 11 wherein said time-varying means comprises a plurality of resistors connected in parallel with said electrical signal and switch means for connecting a preselected one of said resistors in circuit with said averaging means.

13. The circuit as defined in claim 1 further including logarithmic output means for providing an output signal which is a logarithmic representation of one of said signals.

14. The circuit as defined in claim 2 further including logarithmic output means for providing a logarithmic representation of said fourth signal.

15. The circuit as defined in claim 14 wherein said logarithmic output means comprises:
  a source of reference potential;
  third means for providing a sixth signal which is logarithmically related to said reference potential; and
  means for summing said fourth signal and said sixth signal to provide a logarithmic representation of said root mean square of said input signal.

16. The circuit as defined in claim 1 further including means to cause said circuit to provide an output signal which is indicative of the average value of said input signal.

17. The circuit as defined in claim 16 further including logarithmic output means for providing a logarithmic representation of said output signal.

18. The circuit as defined in claim 17 further including means for varying the time base over which the average value of said input signal is obtained.

19. The method of computing a characteristic of an input signal comprising the steps of:
  providing an electrical signal which is a representation of the absolute value of said input signal;
  generating a first signal from said electrical signal which is logarithmically related to said electrical signal;
  summing at least a pair of signals, one of which is said first signal, to provide a second signal which is a function of the sum of at least said pair of signals;
  generating a third signal from said second signal which represents the antilog of said second signal;
  generating a fourth signal from said third signal which represents the average of said third signal over a selected period of time; and
  generating a fifth signal from said fourth signal which is logarithmically related to said fourth signal so that said fifth signal is the other of said pair of signals in the step of summing.

20. The method as defined in claim 19 wherein the step of summing is further characterized as being performed while weighting said first signal at a factor of twice said fifth signal.

21. The method as defined in claim 20 further including the step of generating an output signal which is logarithmically related to said fourth signal.

22. The method as defined in claim 20 further including the step of selecting said period of time.

23. The method as defined in claim 20 further including the step of generating an output signal which represents the average value of said electrical signal.

24. The method as defined in claim 23 further including the step of generating another output signal which is logarithmically related to said average value of said electrical signal.

* * * * *

UNITED STATES PATENT OFFICE
CERTIFICATE OF CORRECTION

Patent No. 3,657,528  Dated April 18, 1972

Inventor(s) Lawrence M. Plante

It is certified that error appears in the above-identified patent and that said Letters Patent are hereby corrected as shown below:

The inventors address should read -- 6092 Gilmere Drive --.

Column 1, line 5, "means" should read -- mean --.

Column 1, line 15, "means" should read -- mean --.

Column 1, line 29, "the" (first occurrence) should read -- an --.

Column 1, line 31, "is" should read -- its --.

Column 1, line 63, "and" should read -- any --.

Column 1, line 64, after "thus" insert -- another aim of --.

Column 1, line 64, "positive" should be cancelled and -- in -- inserted therefor.

Column 3, line 70, "least" should read -- lead --.

Column 5, equation (6) should read -- $e_3 = - KT/Q \log_e [e_2/I_o R]$ --.

Column 5, equation (8) should read -- $e_5 = - KT/Q \log_e [e_4/I_o R]$ --.

Column 5, before equation (10), line 74, "$e_{22}$" should read -- $e_2$ --.

Column 6, line 18, "10" should not be in bold type.

Column 6, equation (13), should read -- $e_8 = e_7 [1/1 + T_1 P]$ --.

UNITED STATES PATENT OFFICE
CERTIFICATE OF CORRECTION

Patent No. 3,657,528​ Dated April 18, 1972

Inventor(s) Lawrence M. Plante

It is certified that error appears in the above-identified patent and that said Letters Patent are hereby corrected as shown below:

Column 6, equation (14), should read -- $e_8 = e_1^2/e_4 \ [1/1 + T_1 P]$ -- .

Column 9, line 5, delete "of said pair" (first occurrence).

Column 9, line 6, "negative" should read -- positive --.

Signed and sealed this 17th day of October 1972.

(SEAL)
Attest:

EDWARD M. FLETCHER, JR.​​​​ROBERT GOTTSCHALK
Attesting Officer​​​​​Commissioner of Patents